(12) United States Patent
Herchenbach et al.

(10) Patent No.: US 7,997,362 B2
(45) Date of Patent: Aug. 16, 2011

(54) DEVICE FOR COUPLING A UNIVERSAL JOINT SHAFT WITH A POWER TAKE-OFF SHAFT OF A TRACTOR

(75) Inventors: Paul Herchenbach, Ruppichteroth (DE); Andreas Sarfert, Bonn (DE); Andreas Lohmüller, Bonn (DE)

(73) Assignee: GKN Walterscheid GmbH (DE)

( * ) Notice: Subject to any disclaimer, the term of this patent is extended or adjusted under 35 U.S.C. 154(b) by 301 days.

(21) Appl. No.: 12/207,659

(22) Filed: Sep. 10, 2008

(65) Prior Publication Data
US 2009/0103972 A1 Apr. 23, 2009

(30) Foreign Application Priority Data
Sep. 11, 2007 (DE) .......................... 10 2007 043 032

(51) Int. Cl.
*A01B 71/06* (2006.01)
(52) U.S. Cl. ......... 180/14.4; 180/53.3; 403/14; 464/901
(58) Field of Classification Search ................. 180/14.4, 180/53.3, 53.6; 172/47, 272; 403/13, 14; 464/901
See application file for complete search history.

(56) References Cited

U.S. PATENT DOCUMENTS

| | | | |
|---|---|---|---|
| 4,071,105 A * | 1/1978 | von Allworden | ............ 180/14.4 |
| 4,588,323 A | 5/1986 | Vollmer et al. | |
| 4,887,680 A | 12/1989 | Nozaka et al. | |
| 5,303,790 A * | 4/1994 | Coleman | ...................... 180/53.3 |
| 7,278,502 B2 * | 10/2007 | Trefz et al. | ............... 180/53.3 X |

FOREIGN PATENT DOCUMENTS

| | | |
|---|---|---|
| AT | 386 988 | 11/1988 |
| DE | 3302379 | 5/1985 |
| EP | 0617882 | 3/1994 |
| EP | 1252807 | 10/2002 |
| EP | 1563723 | 8/2005 |
| EP | 1637024 | 3/2006 |
| EP | 1 932 411 | 6/2008 |
| FR | 2 619 986 | 9/1988 |
| GB | 1194040 | 6/1970 |

* cited by examiner

*Primary Examiner* — Greg Binda
(74) *Attorney, Agent, or Firm* — Harness, Dickey & Pierce, P.L.C.

(57) ABSTRACT

A device for coupling a universal joint shaft to a power take-off shaft (1) of a tractor has a first coupling mechanism (48) that is non-rotatably arranged on the universal joint shaft. A second coupling mechanism (17) is non-rotatably arranged on the power take-off shaft (1) of the tractor. The first and second coupling mechanisms can be non-rotatably coupled to transmit torque. A coupling shield (7) is provided to couple the coupling mechanism (17, 48). The first coupling mechanism (48) is at least indirectly rotationally supported on the coupling shield (7). A locking mechanism (58, 58') projects from the coupling shield (7). A bracket (2) is attachable on the rear of the tractor. The bracket (2) has at least one locking device (5, 5') that is displaceable between an unlocked position and a locked position. The locking device (5, 5') is displaced from the unlocked position into the locked position. The locking device (5, 5') interacts with the locking members (58, 58') of the coupling shield (7) to pull it towards the bracket (2). The first coupling mechanism (48) is transferred into a coupling position to couple it the second coupling mechanism (17).

19 Claims, 7 Drawing Sheets

DEVICE FOR COUPLING A UNIVERSAL JOINT SHAFT WITH A POWER TAKE-OFF SHAFT OF A TRACTOR

CROSS-REFERENCE TO RELATED APPLICATION

This application claims priority to German Patent Application No. 102007043032.0 filed Sep. 11, 2007, which application is herein expressly incorporated by reference.

FIELD

The disclosure relates to a device for coupling a universal joint shaft of an agricultural implement to a power take-off shaft of a tractor. The device has a first coupling mechanism that is non-rotatably arranged on the universal joint shaft. A second coupling mechanism is non-rotatably arranged on the power take-off shaft of the tractor. The first coupling mechanism can be coupled to the second coupling mechanism for torque transmission. Furthermore, a coupling shield is provided that at least indirectly rotatably supports the first coupling mechanism. A locking mechanism interacts with a locking device to transfer the coupling shield into a coupling position and to its locked position.

BACKGROUND

A device is known from DE 33 02 379 C2. A retainer is provided on a carrier arm that is displaceably mounted, via a rolling contact bearing, onto an agricultural implement. A coupling sleeve is rotatably supported, by the rolling contact bearing, which is non-rotatably connected to a joint yoke of a universal joint of a universal joint shaft. The coupling sleeve can be non-rotatably connected to a coupling hub by longitudinal teeth. The coupling sleeve is again non-rotatably connected to a power take-off shaft of a tractor. The coupling sleeve has an inner circumferential groove. In the coupled position, locking balls are pushed by a releasing flange radially outwards into the inner circumferential groove. This prevents an unintended detachment of the coupling sleeve. Only by displacing the releasing flange can the locking balls move inward, so that the coupling sleeve can be pulled off the coupling hub.

The tractor is reversed towards the implement until the coupling sleeve is connected to the coupling hub coupling the two. Beforehand, the carrier arm has to be exactly aligned to the height and the lateral position of the coupling hub. Thus, a direct coupling is enabled between the coupling sleeve and the coupling hub.

EP 1 637 024 A1 shows a coupling frame that is attached on a three point linkage of a tractor. Coupling hooks for a three-point coupling of an implement are provided on the coupling frame. Furthermore, a coupling element is rotatably and axially displaceably supported on the coupling frame. The coupling element is connected to a universal joint shaft. Also, the coupling is connected to the power take-off shaft of the tractor. As soon as the implement is coupled to the coupling frame, the coupling element on the coupling frame is arranged in a centered position relative to the coupling element on the implement. The position relative to the three-point coupling of both coupling elements is identical. The coupling element on the coupling frame is then manually displaced by a moving lever axially in the direction toward the implement. The coupling elements, in the form of a jaw clutch coupling, are brought into engagement.

EP 1 563 723 A1 shows a device for coupling a universal joint shaft to a power take-off shaft of a tractor. A yoke-like coupling element is provided on the tractor and is axially displaceable parallel to the rotational axis of the power take-off shaft of the tractor. In an extended position, a coupling element of the universal joint shaft can be inserted radially into the rotational axis between two arms of the yoke-like coupling element. The coupling element of the universal joint shaft has a groove and is formed rotationally symmetrically to the rotational axis. The yoke-like coupling element engages the coupling element. The yoke-like coupling element can be pulled axially towards the power take-off shaft. The coupling element of the universal joint shaft is also axially displaced. Due to the pulling, the coupling element of the universal joint shaft is pulled onto the power take-off shaft. The longitudinal teeth provide a non-rotatable connection between the power take-off shaft and the coupling element of the universal joint shaft.

SUMMARY

It is an object of the disclosure to provide a device to couple a universal joint shaft to a tractor power take-off shaft. The device has a simple structure and ensures an easy and reliable coupling.

The object is solved by a device comprising a first coupling mechanism that is non-rotatably arranged on the universal joint shaft A second coupling mechanism is non-rotatably arranged on the power take-off shaft of the tractor. The first and second coupling mechanisms are non-rotatably coupled together to transmit torque. A coupling shield is provided to couple the coupling mechanisms. The first coupling mechanism is at least indirectly rotationally supported by the coupling shield. The first coupling mechanism includes a locking mechanism. A bracket with at least one locking device is attachable on the rear of the tractor. The locking device is displaceable between an unlocking position and a locking position. The locking device is displaced from the unlocking position into the locking position. The interaction of the locking device with the locking mechanism causes the coupling shield to be pulled towards the bracket. As this occurs, the first coupling mechanism is transferred into a coupling position to couple with the second coupling mechanism.

The tractor is initially reversed to couple with the implement. During this, the universal joint shaft is still not connected to the power take-off shaft. The universal joint shaft does not have to be exactly aligned with the power take-off shaft beforehand. Further, the driver does not have to drive exactly to the implement to couple the universal joint shaft to the power take-off shaft. The coupling shield is initially moved into a starting position where the locking device can grip the locking mechanism. The actual coupling process takes place by displacing the locking device. Accordingly, the locking device interacts with the locking mechanism so that the coupling shield is pulled towards the tractor. As this occurs, the universal joint shaft is coupled to the power take-off shaft or, as will be explained later, is transferred into a position, where a self-actuated coupling of the two coupling mechanism can take place.

The locking device serves, besides the pulling of the coupling shield, also to lock the coupling mechanisms to each other to prevent an unintended detachment.

A large advantage of the present disclosure is that no cumbersome components, such as coupling frames, are necessary. Further, the universal joint shaft is only moved in one direction. This applies to the approaching movement of the tractor as well as to the actual coupling process of the universal joint shaft to the power take-off shaft. A further coupling direction, transverse to the rotational axes, is not necessary. Thus, a simple coupling process is achieved.

Preferably, the first coupling mechanism is represented by a first coupling element. It can be non-rotatably connected to the universal joint shaft. Furthermore, the second coupling mechanism is represented by a second coupling element. It can be non-rotatably connected to the power take-off shaft of the tractor. Thus, two coupling elements are provided that can be connected to a conventional power take-off shaft of a tractor and a conventional universal joint shaft. However, it is also possible for the first coupling mechanism to be represented by a joint yoke with a coupling sleeve. The coupling sleeve has a bore with inner longitudinal teeth. In this case, the second coupling mechanism can be represented by outer longitudinal teeth on the power take-off shaft.

The locking mechanism may be provided by locking faces on the coupling shield. In this case, the locking device comprises, preferably, rocker levers. The levers are pivotable between an unlocking position and the locking position. The levers can engage behind the locking faces. The locking faces of the coupling shield can be gripped by the rocker lever and pulled close by engaging behind the locking faces.

One or more hydraulic cylinders may be provided to actuate the rocker levers. The rocker levers may be rigidly connected to each other. Thus, they can be pivoted together. In this case, one hydraulic cylinder is sufficient to actuate the rocker levers. When, however, the rocker levers are separately pivotable and are not connected to each other, it may be necessary to provide two hydraulic cylinders.

A simple constructed locking mechanism is provided insofar, as they comprise two studs projecting laterally from the coupling shield.

The rocker levers can be locked mechanically in their locking position to prevent an unintended decoupling. A retaining arm is provided on at least one rocker lever to prevent the decoupling. The retaining arm can be pivoted between a retaining position and a releasing position. In the retaining position, the retaining arm engages with a first retaining face behind the rocker lever in its locking position and retains it in the locking position.

The coupling shield is provided with a first centering mechanism to make the coupling process simple and secure. The first centering mechanism interacts with a second centering mechanism of the bracket. When the coupling shield is pulled toward the bracket, such that it is pulled into a tight position, a first rotational axis of the first coupling mechanism is aligned to a second rotational axis of the second coupling mechanism. The first centering mechanism may comprise first guide faces and the second centering mechanism may comprise second guide faces.

Preferably, the first guide faces are formed by portions of the outer circumferential face of the coupling shield. The second guide faces are formed by guide arms projecting axially from the bracket.

Four guide arms are provided and arranged in pairs opposite to each other. They are distributed around the second rotational axis. The distance at a right angle relative to the second rotational axis, increase between the second guide faces of two opposite guide arms in the direction towards the free ends of the guide arms.

The guide arms and the guide faces form, preferably, a rough centering of the coupling shield relative to the bracket. Thus, when driving the tractor closer or when pulling the coupling shield close, initially the coupling shield is inserted between the guide arms and is centered roughly relative to the second rotational axis.

For fine centering, the first centering mechanism is provided with a first centering face arranged concentrically to the rotational axis. The second centering mechanism includes a second centering face arranged concentrically to the second rotational axis. One of the centering faces is formed as an outer circumferential face. The other centering faces are formed as an inner circumferential face. At least one of the centering faces is formed conically.

In a preferred embodiment, the first centering face may be formed by an outer face of the first coupling mechanism. The second centering face may be formed by a conical inner face of a centering sleeve on the second coupling mechanism.

Thus, in the further coupling process, fine centering generally takes place by pulling close the coupling shield utilizing the locking device.

Rough centering relative to the stationary components, namely the coupling shield and the bracket, takes places initially by driving the tractor close to the implement or by pulling close the coupling shield. When pulling the coupling shield close to the bracket, by the locking elements, fine centering relative to the rotating components takes place. For this, centering faces are provided on the coupling mechanism.

Preferably, the first coupling mechanism is connected to a joint component of a joint of the universal joint shaft. The first coupling mechanism is rotatably supported on the coupling shield.

The universal joint shaft is preferably a cardan joint shaft. The joint yoke of the cardan joint is indirectly supported, via the first coupling mechanism, on the coupling shield.

Preferably, the first coupling mechanism has axially projecting first driving pawls. The second coupling mechanism has axially projecting second driving pawls. The driving pawls engage in a coupled condition of the two coupling mechanism, respectively, in gaps between the driving pawls of the other coupling element.

A simple coupling mechanism is provided insofar, as one of the coupling mechanism is axially displaceable between a position, where it is pushed forward in direction towards the other coupling mechanism. For a retracted position, springs mechanism are provided to act upon the axially displaceable coupling mechanism with a force in the direction towards the pushed forward position.

In this case, the second coupling mechanism is axially displaceably guided relative to the power take-off shaft.

Therefore, in the coupling position of the first coupling mechanism, two positions of the two coupling mechanisms relative to each other are possible. The pawls of the first coupling mechanism engage, directly after the transferral of the first coupling mechanism into the coupling position, into gaps between the driving pawls of the second coupling mechanism. Thus, a direct non-rotatable connection is achieved. When the coupling mechanisms are arranged in a different rotational position relative to each other, the driving pawls rotate about each other at the ends and do not engage with the other. In the latter case, one of the coupling mechanisms is axially displaced. As soon as the power take-off shaft is rotated, the one coupling mechanism is rotated relative to the other coupling mechanism. Thus, the driving pawls of both coupling mechanisms can engage each other.

In this case, it may, preferably, be provided that the second coupling mechanism is axially displaceably guided relative to the power take-off shaft.

Further areas of applicability will become apparent from the description provided herein. The description and specific examples in this summary are intended for purposes of illustration only and are not intended to limit the scope of the present disclosure.

DRAWINGS

A preferred embodiment is described in detail in the following by the drawings.

DETAILED DESCRIPTION

Figure 1:
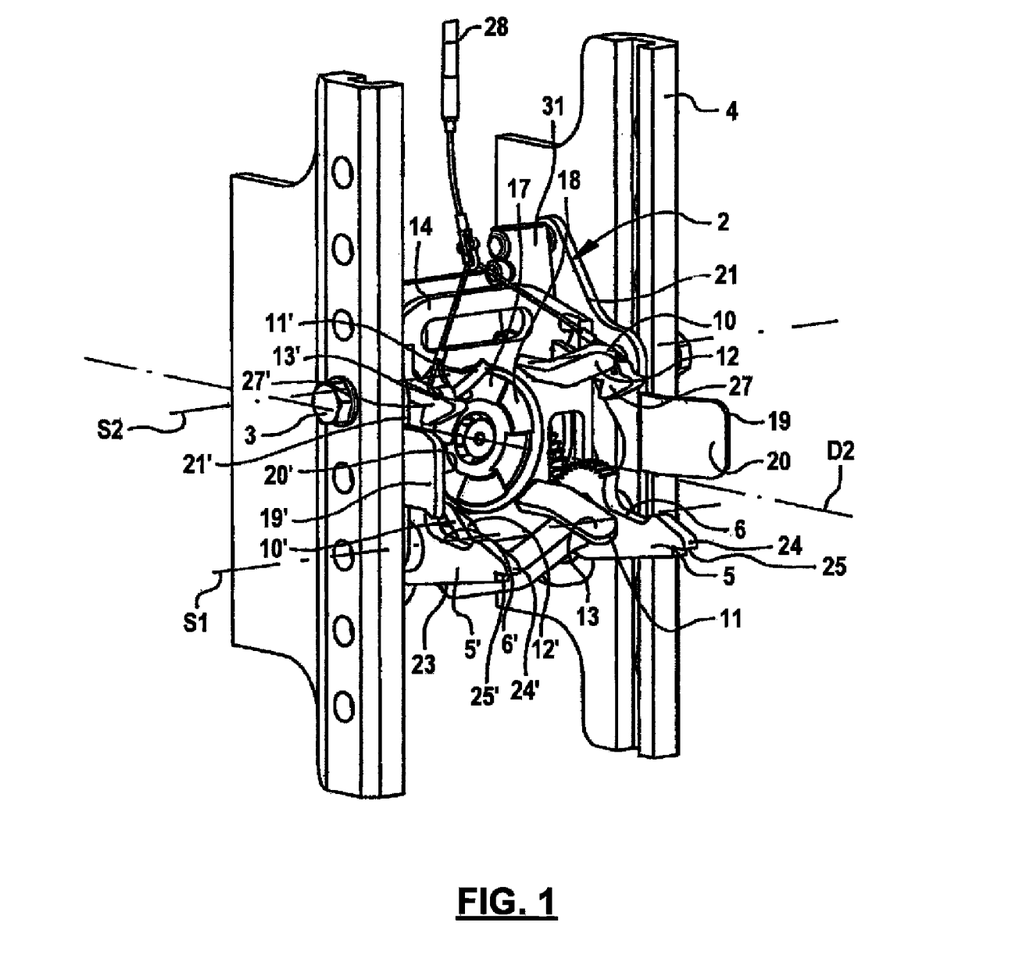
FIG. 1 is a perspective view of a device according to the disclosure in the unlocking position, where no universal joint shaft is coupled to the power take-off shaft.
Figure 2:
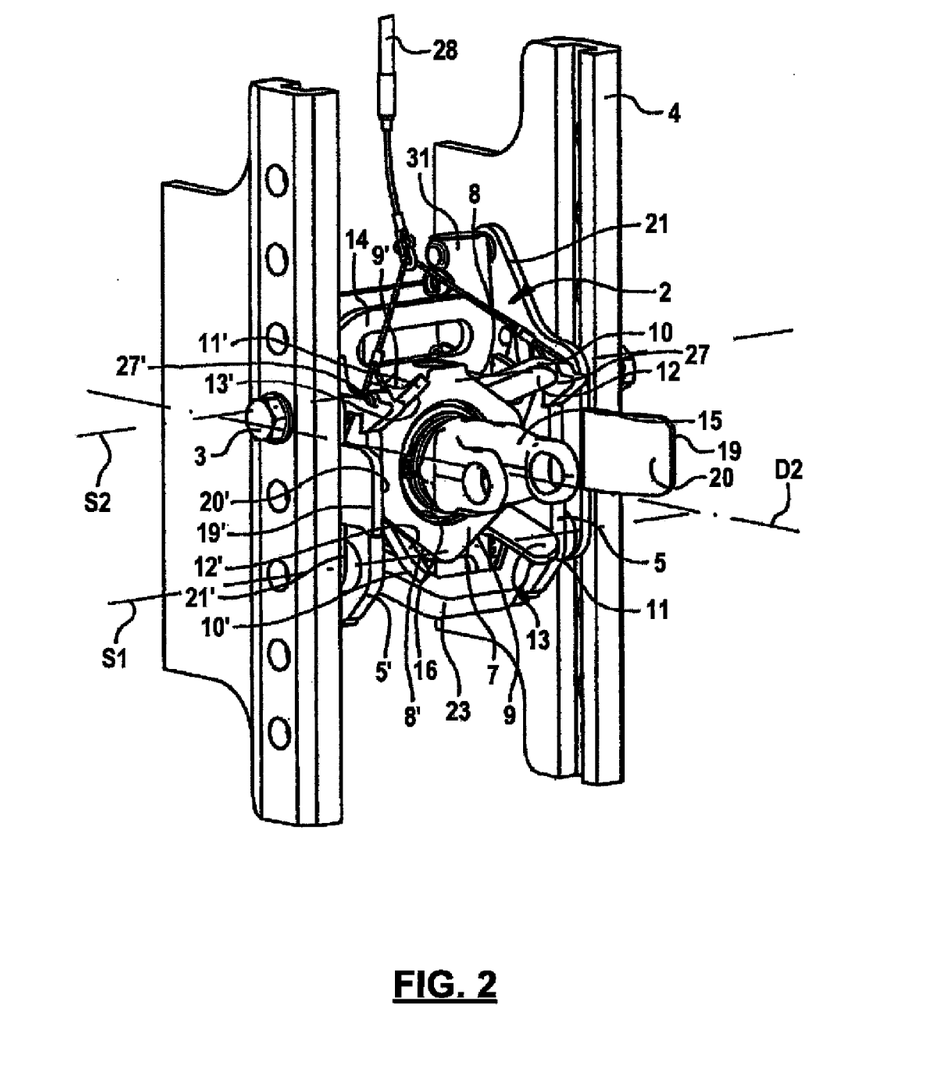
FIG. 2 is a perspective view of the device according to FIG. 1 with the coupling shield in a locked position.

FIGS. 1 and 2 show perspective views of a device according to the disclosure at the rear of a tractor.

In FIG. 1 the power take-off shaft 1 of the tractor is shown, which is rotatable around a second rotational axis D2. A fastening frame 4 is provided at the rear of the tractor and is part of the tractor. A bracket 2 is mounted by fastening screws 3 to the frame 4. The bracket 2 carries two rocker levers 5, 5' that are pivotable around a first pivot axis S1 between an unlocked position, shown in FIG. 1 and a locked position, shown in FIG. 2. The rocker levers 5, 5' have, respectively, a catching profile 6, 6', interacting with locking faces on a coupling shield 7, not shown here and described later. The rocker levers 5, 5' are part of a locking device on the bracket 2. The coupling shield 7 has a locking mechanism in the form of laterally projecting studs, which form locking faces. When pivoting the rocker levers 5, 5' from the unlocking position into the locking position, the catching profiles 6, 6' engage behind the studs on the coupling shield 7 and pull close to the bracket 2, to couple, as later described, the universal joint shaft to the power take-off shaft 1.

The coupling shield 7 has a central bore 16 to rotationally support a joint yoke 15 of a universal joint of a universal joint shaft (here not completely shown). Initially, a rough precentering has to take place, to ensure a perfect coupling when moving the coupling shield 7 closer to the bracket 2. To accomplish this, initial guide plates 19, 19' are provided. The guide plates 19, 19' are projectingly arranged to the rear on the side plates 21, 21' of the bracket 2. The guide plates 19, 19' have guide faces 20, 20' that oppose one another. Starting from the side plates 21, 21', the length of the guide plates 19, 19' increases in a direction towards the implement. Thus, initially a rough centering of the coupling shield 7 will take place, such that the laterally projecting studs are guided along the guide faces 20, 20' of the guide plates 19, 19' and are centered.

A base plate 14, which is part of the bracket 2, is arranged at a right angle to the second rotational axis D2 of the power take-off shaft 1. Guide arms 10, 10', 11, 11' project from the base plate 14 to the rear in a direction towards the implement. The guide arms 10, 10', 11, 11' form, respectively, a second guide face 12, 12', 13, 13'. The guide arms 10, 10', 11, 11' are distributedly arranged around the second rotational axis D2 and are arranged in pairs opposite to each other. The second guide faces 12, 12', 13, 13' are arranged in pairs opposite to each other. The distance, at a right angle to the second rotational axis D2 between the second guide faces 12, 12', 13, 13', increases in direction towards the free ends of the guide arms 10, 10', 11, 11'.

The coupling shield 7 has first guide faces 8, 8', 9, 9' on an outer circumference face. The first guide faces 8, 8', 9, 9' are arranged in pairs opposite to each other. When pulling the coupling shield 7 close or when driving the tractor close to the implement, the first guide faces 8, 8', 9, 9' abut, respectively, one of the second guide faces 12, 12', 13, 13'. Thus, a rough centering of the coupling shield 7 takes place.

As it is visible from FIG. 1, the device further comprises a second coupling mechanism in the form of a second coupling element 17 that has second driving pawls 18. The second driving pawls 18 project at the end side in a direction of the second rotational axis D2 and are formed with gaps between them. The second coupling element 17 can be coupled with first coupling mechanism in the form of a first coupling element, which will be described in detail later, and is correspondingly formed to the second coupling element 17. In the locking position shown in FIG. 2, the driving pawls of both coupling elements engage each other, so that between these a rotationally fast connection is achieved. The first coupling element is non-rotatably connected with the joint yoke 15. The second coupling element 17 is non-rotatably held via a bore 22 with longitudinal teeth on the power take-off shaft 1, that also has longitudinal teeth.

Figure 3:
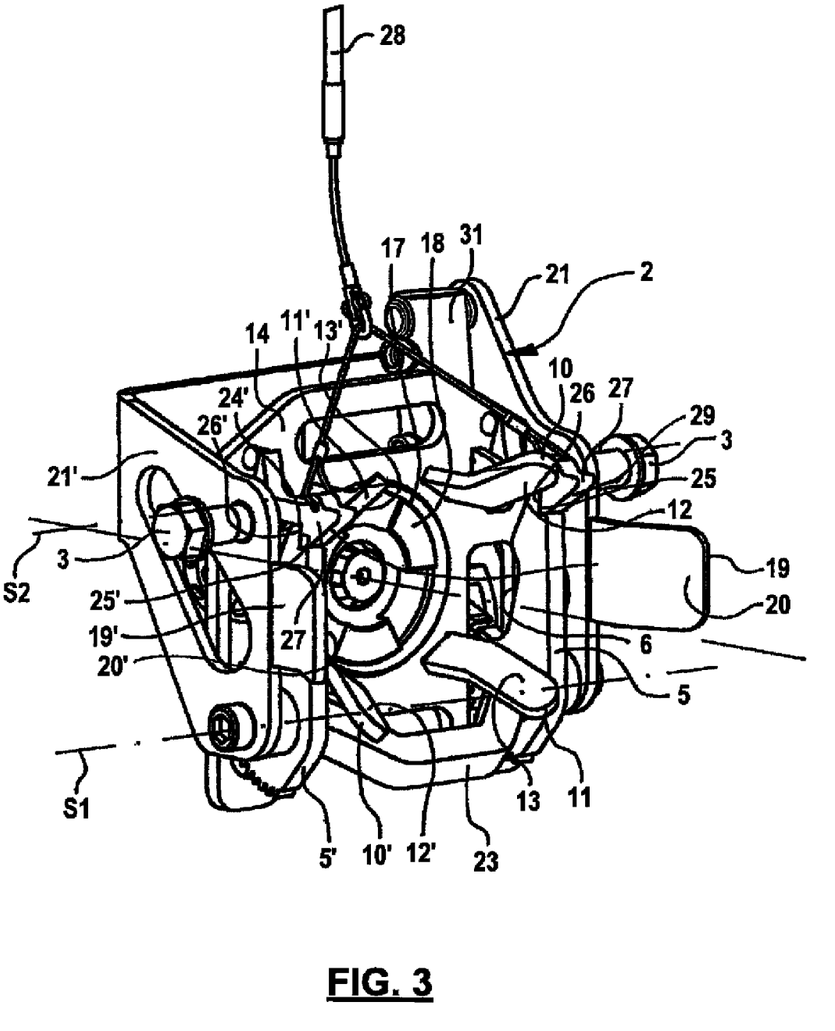
FIG. 3 is an enlarged perspective view according to FIG. 2 without the coupling shield.

FIG. 3 shows an enlarged view of the device without the coupling shield. The rocker levers 5, 5' are in the locking position. The two rocker levers 5, 5' are connected to each other by a bridge 23 so that they are pivoted together. Thus, a single driving unit, e.g. a hydraulic cylinder, is sufficient, to pivot both rocker levers 5, 5'. In the present case a double acting hydraulic cylinder is used, as described in detail later. However, it is generally also possible, that the two rocker levers 5, 5' are not connected to each other. Then, they may be pivoted together via a common actuation element by a single driving unit or by two separate driving units.

The rocker levers 5, 5' are pivotable around the first pivot axis S1. At their free ends 24, 24', two retaining faces 25, 25' are provided. They are directed to the rear in the locking position. On the bracket 2, two retaining arms 27, 27' are provided. A first retaining face 26, 26' is formed on the two retaining arms 27, 27'. The rocker levers 5, 5' have their second retaining faces 25, 25' supported against the first retaining face 26, 26' in the locked position. The rocker levers 5, 5' are, therefore, prevented from transferring into the unlocked position.

The retaining arms 27, 27' can be transferred, by mechanism of a Bowden cable 28 from the above described retaining position around a second pivot axis S2 into a released position. Here, the rocker levers 5, 5' are released, so that they can be transferred from the locked position shown in FIG. 3 to their unlocked position shown in FIG. 1. Instead of a Bowden cable, other actuation mechanism are possible, e.g. pneumatical or electro-mechanical components.

The advantage of this mechanical locking of the rocker levers 5, 5' is that with a hydraulic activation of the rocker levers 5, 5' in the locking position no hydraulic pressure has to be exerted onto the driving hydraulic cylinder. Rather, the rocker levers 5, 5' are held by mechanism of the mechanical locking in the locking position. This also leads to the fact, that even when the pressure decreases in the hydraulic system, the universal joint shaft remains securely coupled.

Generally, in the present embodiment with a bridge 23 connecting the two rocker levers 5, 5' to each other, it would be sufficient to provide one retaining arm 27, 27'.

When moving the rocker levers 5, 5' from their unlocked position into their locked position, the retaining arms 27, 27' do not have to be externally actuated, to be transferred from the retaining position into the released position. For this, one actuation face 29, 29 is provided for each retaining arm 27, 27'. The free ends 24, 24' of the rocker levers 5, 5' abut the actuation faces 29, 29 and move the retaining arms 27, 27' from their retaining position into the releasing position, until the retaining arms 27, 27' engage behind the rocker levers 5, 5'. Thus, the first retaining faces 26, 26' are self-actuated and transferred into their retaining position. For this, spring elements 30 are provided that act upon the retaining arms 27, 27' to take up their retaining position.

Figure 4:
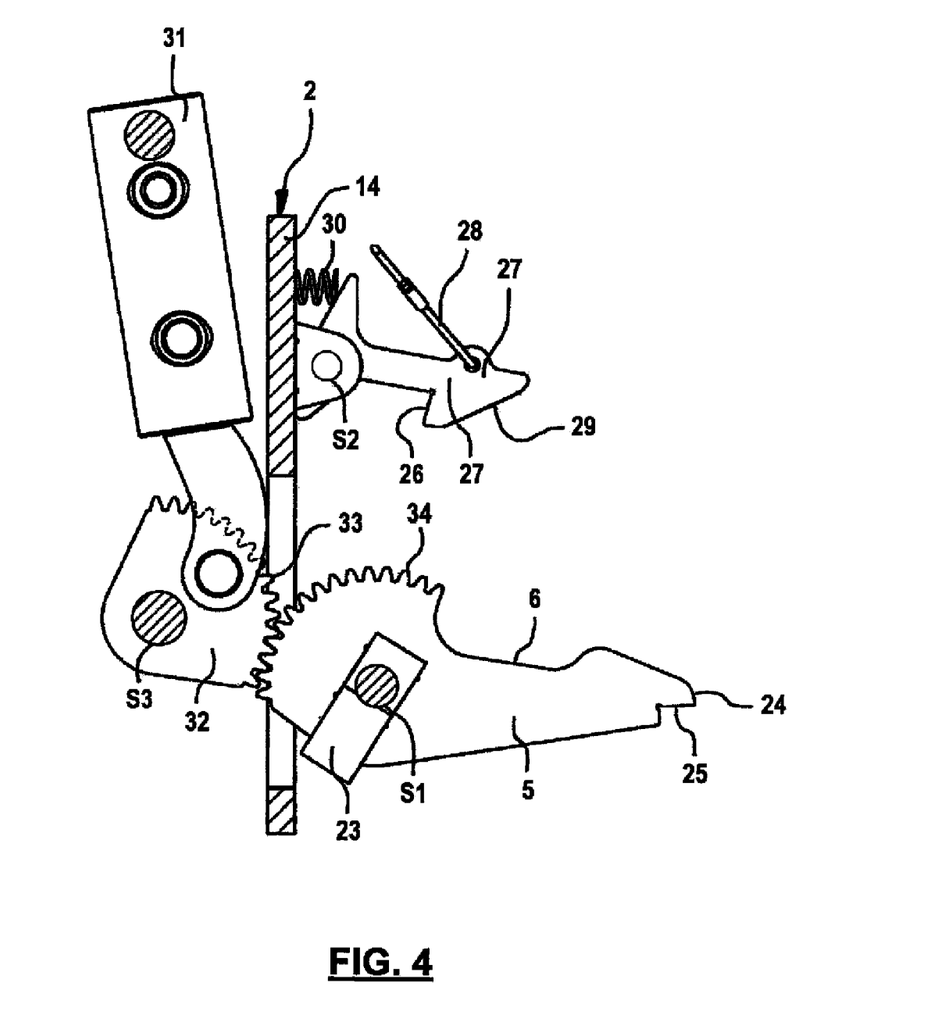
FIG. 4 is a side partial cross-sectional view of the locker levers including their actuation elements.

FIG. 4 shows, how the rocker levers 5, 5' are actuated. A hydraulic cylinder 31 is pivotably mounted on the piston-side on the bracket 2 and is pivotably mounted on the piston-rod-side at the actuation element 32. The actuation element 32 is again pivotably mounted around a third pivot axis S3 on the bracket 2. The hydraulic cylinder 31 is eccentrically attached to the third pivot axis S3 at the actuation element 32. The actuation element 32 has a first tooth portion 33 that is coaxially arranged to the third pivot axis S3. The first tooth portion 33 engages with a second tooth portion 34 of one of the rocker levers 5. The second tooth portion 34 is coaxially arranged with the first pivot axis S1. Thus, by actuating the hydraulic cylinder 31, the actuation element 32 is pivoted around the third pivot axis S3. Due to the teeth engagement of the two tooth portions 33, 34, the rocker lever 5 is pivoted. The rocker lever 5 is, as already described, connected by the bridge 23 to the other rocker lever 5', so that both rocker levers 5, 5' are moved synchronously. If no bridge 23 is provided, a further actuation element has to be provided, which actuates the other rocker lever 5, 5'. Thus, either the two actuation elements, then provided, are non-rotatably connected to each other or a further hydraulic cylinder is necessary.

Figure 5:
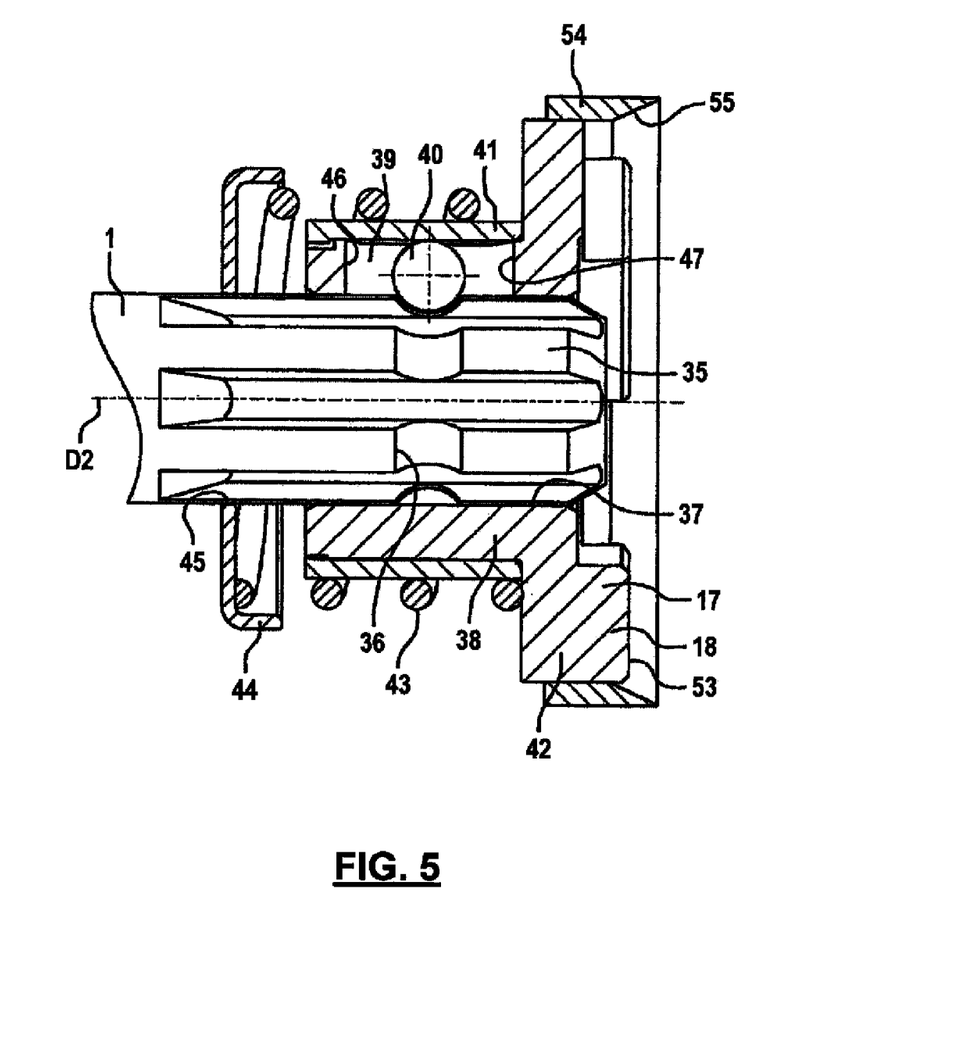
FIG. 5 is a longitudinal sectional view through the second coupling element on the power take-off shaft.
Figure 6:
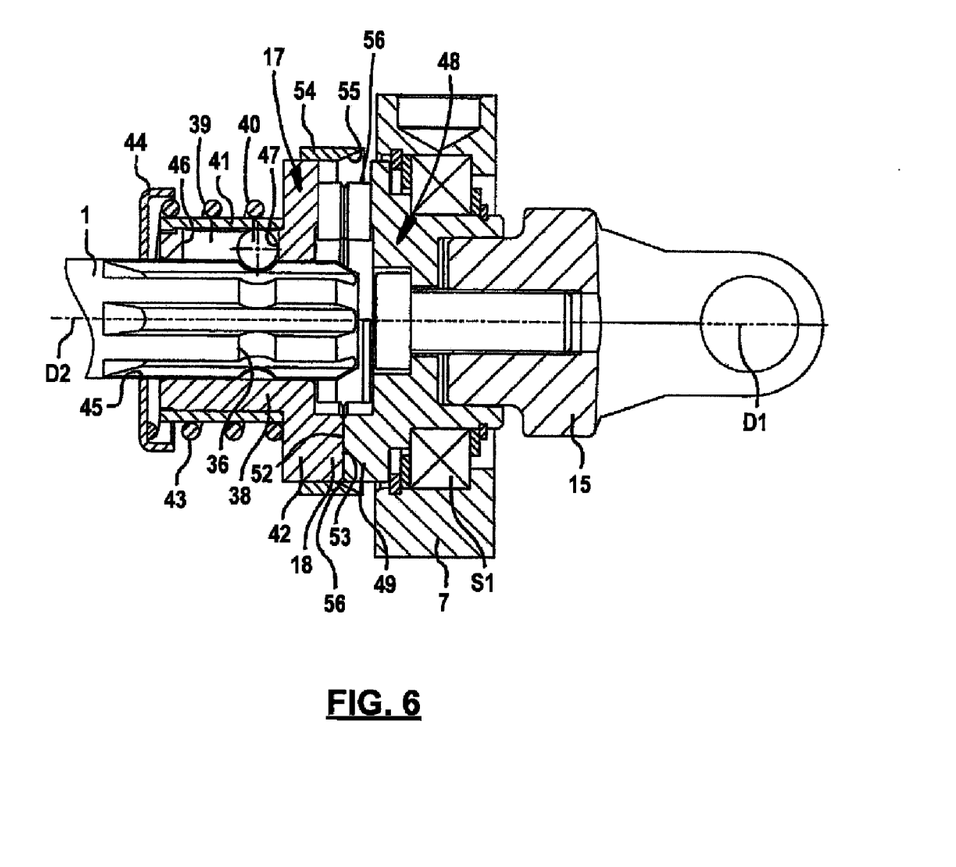
FIG. 6 is a longitudinal sectional view through the first and the second coupling element.

FIGS. 5 and 6 show the coupling mechanism in detail. The coupling procedure will be described in detail.

FIG. 5 shows the power take-off shaft 1 with its longitudinal teeth 35. A circumferential groove 36 is formed in the longitudinal teeth 35. The groove 36 is coaxially provided on the second rotational axis D2. The second coupling component 17 is pushed onto the power take-off shaft 1 by a hub 38. The hub 38 has a central bore with longitudinal teeth corresponding to the longitudinal teeth 35 of the power take-off shaft 1.

The hub 38 of the second coupling element 17 has an elongated hole 39. The hole 39 is axially limited and extends parallel to the second rotational axis D2. The elongated hole 39 is radially formed as a trough extending through opening. A locking ball 40 rests in the elongated hole 39. The ball 40 engages in the groove 36 of the power take-off shaft 1. A sleeve 41 is coaxially provided around the hub 38. The sleeve 41 holds the locking ball 40 in the groove 36. The sleeve 41 is rotatably held on the hub 38 and has a through opening across its circumference. Thus, the sleeve 41 can be rotated such, that the through opening aligns with the elongated hole 39 and the ball can radially leave the groove 36. Thus, the second coupling element 17 can be removed from the power take-off shaft 1.

The second coupling element 17 further forms a driving portion 42, in the form of a flange. The flange has driving pawls 18 axially projecting. The second coupling element 17 is acted upon by a spring 43 in the direction of an extended position. The spring 43 is supported on the one hand on the driving portion 42 of the second coupling element 17 and on the other hand on a retaining plate 44. The retaining plate 44 has a central bore 45. The bore cross-section corresponds to the longitudinal teeth 35 of the power take-off shaft 1. Thus, the retaining plate 44 is rotationally securely held and is supported on the end of the longitudinal teeth and offers an axial abutment for the spring 43.

In FIG. 5 the second coupling element 17 is shown in an intermediate position. In a completely extended position, not shown here, the second coupling element 17 is supported with a first abutment 46, which is formed by the elongated hole 39, on locking ball 40, held in the groove 36. In a completely retracted position, as shown in FIG. 6, the second coupling element 17 is supported with a second abutment 47, which is formed by the elongated hole 39, on the locking ball 40. Thus, pre-defined positions of the second coupling element 17 are achieved.

FIG. 6 shows the second coupling element 17 as well as the coupling shield 7 together with the first coupling element 48. The first coupling element 48 has first driving pawls 49 pointing towards the second coupling element 17. The first coupling element 48 is connected by a fastening screw 50 to the yoke 15 of a universal joint shaft, not shown here. The first coupling element 48 and also the joint yoke 15 are indirectly rotatably supported in the coupling shield 7 by a rolling contact bearing 51.

In the represented position, the first driving pawls 49 abut its first end faces 52 with second end faces 53 of the second driving pawls 18. In this position, the second coupling element 17 is transferred into a retracted position. The second coupling element 17 is supported with the second abutment 47 on the locking ball 40. The power take-off shaft 1 is rotated. This rotates the second coupling element 17 relative to the first coupling element 48. The first driving pawls 18 reach a position where they align with the gaps between the first driving pawls. Thus, the first coupling element 17 is coupled to the second coupling element 48. The second coupling element 17 is released into an intermediate position and the first driving pawls 49 engage the second driving pawls 18.

After the above described rough centering, a fine centering is carried out. For this, the first coupling element has a first centering face 56 that is provided on an outer circumferential face of the first coupling element 48. The second coupling element 17 has a second centering face 55 in form of a conical inner face. Face 55 is formed by a centering sleeve 54. The centering sleeve 54 rests externally on the driving portion 42 of the second coupling element 17. When transferring the first coupling element 48 into the position shown in FIG. 6, the first coupling element 48, with the first centering face 56, is inserted into the centering sleeve 54. It is centered by the second centering face 55, in the form of a conical inner face.

Figure 7:
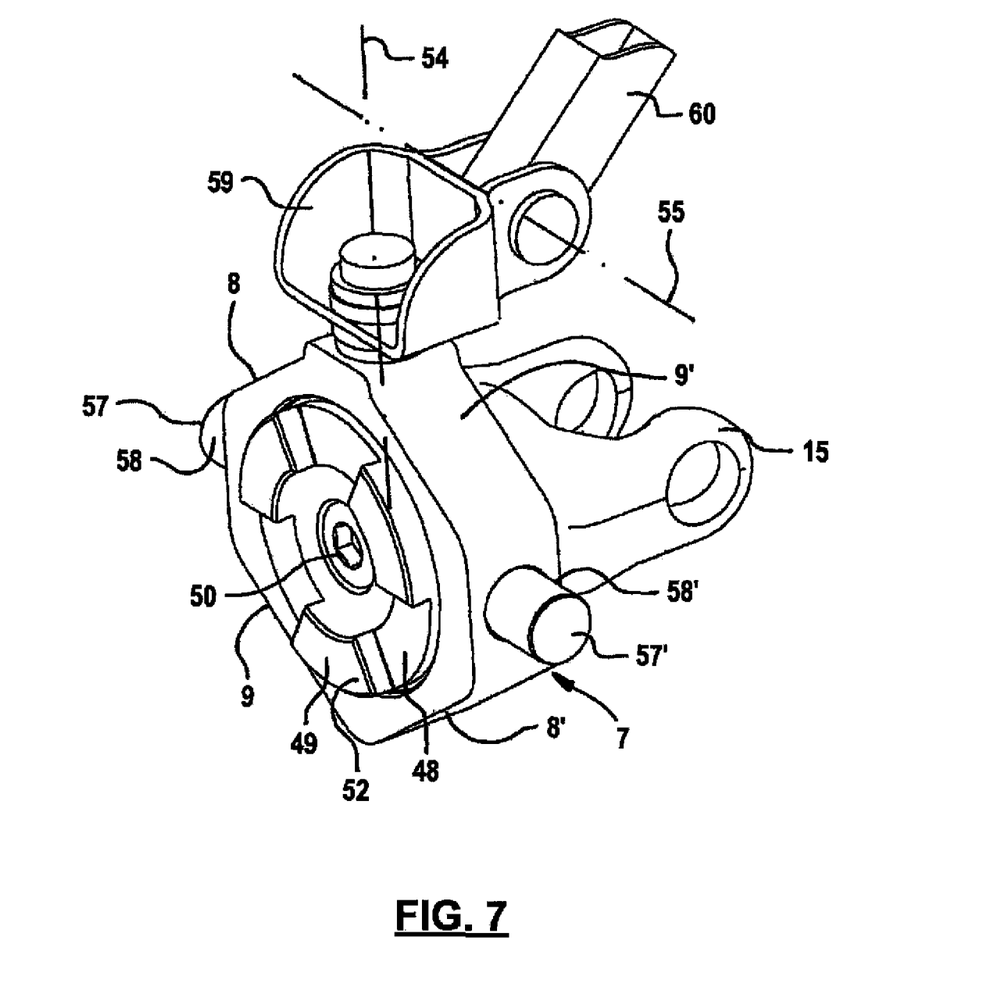
FIG. 7 is a perspective view of the coupling shield with the first coupling element.

FIG. 7 shows a perspective view of the coupling shield 7. The coupling shield has two laterally projecting studs 57. The studs 57 form, respectively, with their outer circumferential face a locking face 58. The studs 57 are engaged by the rocker levers 5, 5' according to FIGS. 1 to 3 and are pulled towards the bracket 2.

The coupling shield 7 is pivotably mounted on a pivot bearing 59. The coupling shield can be pivoted around a vertical pivot axis S4 relative to the pivot bearing 59. The pivot bearing 59 is again pivotable on a retaining arm 60, around a horizontal pivot axis S5. The retaining arm is mounted on an agricultural implement. The coupling shield 7 is freely adjustable relative to the implement and, thus, can be roughly pre-centered for a successful coupling process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for coupling a universal joint shaft to a power take-off shaft of a tractor, comprising:
   a first coupling mechanism arranged on a universal joint shaft;
   a second coupling mechanism arranged on the power take-off shaft of the tractor, said first and second coupling mechanism can be coupled for torque transmission;
   a coupling shield for coupling the first and second coupling mechanisms, said first coupling mechanism is at least indirectly rotationally supported by said coupling shield;
   a locking member is provided at said coupling shield wherein the at least one locking member has locking faces; and
   a bracket attachable on the rear of the tractor, the bracket has at least one locking device displaceable between an unlocking position and a locking position, said locking device comprises rocker levers that are pivotable between the unlocking position and the locking position and serve to engage behind the locking faces pulling said shield towards the bracket and the first coupling mechanism is transferred into a coupling position for coupling to the second coupling mechanism.

2. The device according to claim 1, wherein the first coupling mechanism is represented by a first coupling element that is connected to the universal joint shaft, and the second coupling mechanism is represented by a second coupling element that is connected to the power take-off shaft of the tractor.

3. The device according to claim 1, wherein one or more hydraulic cylinders are provided to actuate the rocker levers.

4. The device according to claim 1, wherein the at least one locking member comprises two studs projecting laterally from the coupling shield.

5. The device according to claim 1, wherein the rocker levers are mechanically lockable in their locking position.

6. The device according to claim 5, wherein at least one rocker lever includes a retaining arm that is pivotable between a retaining position and a releasing position, in the retaining position, said retaining arm engages with a first retaining face behind the rocker levers in its locking position and retains the rocker levers in the locking position.

7. The device according to claim 1, wherein the first coupling mechanism is connected to a joint component of a joint of the universal joint shaft.

8. The device according to claim 7, wherein the first coupling mechanism is rotatably supported on the coupling shield.

9. The device according to claim 8, wherein the universal joint shaft is a cardan joint shaft and a joint yoke of a cardan joint is indirectly supported via the first coupling mechanism on the coupling shield.

10. The device according to claim 1, wherein the first coupling mechanism has axially projecting first driving pawls and the second coupling mechanism has axially projecting second driving pawls, and said driving pawls engage in gaps between the driving pawls of the other coupling element in a coupled condition of the two coupling mechanism, respectively.

11. The device according to claim 1, wherein one of the coupling mechanisms is axially displaceable between a position that is moved forward in a direction towards the other coupling mechanism and a retracted position, a spring acts upon and axially displaces the coupling mechanism with a force in a direction towards the moved forward position.

12. The device according to claim 11, wherein the second coupling mechanism is axially displaceably guided relative to the power take-off shaft.

13. A device for coupling a universal joint shaft to a power take-off shaft of a tractor, comprising:
    a first coupling mechanism arranged on a universal joint shaft;
    a second coupling mechanism arranged on the power take-off shaft of the tractor, said first and second coupling mechanism can be non-rotatably coupled for torque transmission;
    a coupling shield for coupling the first and second coupling mechanisms, said first coupling mechanism is at least indirectly rotationally supported by said coupling shield;
    a locking member provided at said coupling shield;
    a bracket attachable on the rear of the tractor, the bracket has at least one locking device displaceable between an unlocking position and a locking position, said at least one locking device being displaced from the unlocking position into the locking position wherein said at least locking device interacts with the locking member of the coupling shield pulling said shield towards the bracket and the first coupling mechanism is transferred into a coupling position for coupling to the second coupling mechanism; and
    wherein the coupling shield includes a first centering mechanism that interacts with a second centering mechanism of the bracket when pulling the coupling shield toward the bracket such that a first rotational axis of the first coupling mechanism is aligned with a second rotational axis of the second coupling mechanism.

14. The device according to claim 13, wherein the first centering mechanism comprises first guide faces and the second centering mechanism comprise second guide faces.

15. The device according to claim 14, wherein the first guide faces are formed by portions of the outer circumferential face of the coupling shield and the second guide faces are formed by guide arms projecting axially from the bracket.

16. The device according to claim 15, wherein four guide arms are arranged in pairs opposite to each other and are distributed around the second rotational axis, and the distance, at a right angle relative to the second rotational axis, between the second guide faces of two opposite guide arms increases in the direction towards the free ends of the guide arms.

17. A device according to claim 13, wherein the first centering mechanism comprise a first centering face arranged concentric to the rotational axis and that the second centering mechanism comprise a second centering face arranged concentric to the second rotational axis, wherein one of the centering faces is formed as an outer circumferential face and the other of the centering faces is formed as an inner circumferential face and wherein at least one of the centering faces is conically formed.

18. The device according to claim 17, wherein the first centering face is formed by an outer face of the first coupling mechanism and the second centering face is formed by a conical inner face of a centering sleeve on the second coupling mechanism.

19. A device for coupling a universal joint shaft to a power take-off shaft of a tractor comprising:
- a first coupling mechanism non-rotatably arranged on a universal joint shaft;
- a second coupling mechanism non-rotatably arranged on the power take-off shaft of the tractor, said first and second coupling mechanism can be non-rotatably coupled for torque transmission;
- a coupling shield for coupling the first and second coupling mechanisms, said first coupling mechanism is at least indirectly rotationally supported by said coupling shield;
- at least one locking member provided at said coupling shield,
- a bracket attachable on the rear of the tractor;
- at least one locking device displaceably connected to the bracket and displaceable between an unlocking position and a locking position and detachably engageable to the at least one locking member, said at least one locking device being displaced from the unlocking position into the locking position wherein said at least locking device interacts with the locking member of the coupling shield pulling said shield towards the bracket and the first coupling mechanism is transferred into a coupling position for coupling to the second coupling mechanism.

* * * * *